United States Patent [19]

Lu

[11] Patent Number: 5,777,910

[45] Date of Patent: Jul. 7, 1998

[54] SPARSE EQUALIZATION FILTER ADAPTIVE IN TWO DIMENSIONS

[75] Inventor: Cheng-Youn Lu, Cresskill, N.J.

[73] Assignee: Thomson multimedia S.A., Boulogne, Cedex, France

[21] Appl. No.: 752,295

[22] Filed: Nov. 19, 1996

[51] Int. Cl.[6] .................................................. G06F 17/10
[52] U.S. Cl. ........................................ 364/724.2; 375/232
[58] Field of Search ........................... 364/724.19–724.2; 375/229–236

[56] References Cited

U.S. PATENT DOCUMENTS

| 5,001,701 | 3/1991 | Gay | 370/290 |
|---|---|---|---|
| 5,045,945 | 9/1991 | Herman et al. | 348/614 |
| 5,050,119 | 9/1991 | Lish | 364/724.19 |
| 5,343,522 | 8/1994 | Tatrou et al. | 379/410 |
| 5,528,311 | 6/1996 | Lee et al. | 348/607 |
| 5,530,485 | 6/1996 | Kim et al. | 348/611 |

*Primary Examiner*—Tan V. Mai
*Attorney, Agent, or Firm*—Joseph S. Tripoli; Eric P. Herrmann; Ronald H. Kurdyla

[57] ABSTRACT

A sparse digital adaptive equalizer including forward and feedback Finite Impulse Response (FIR) filters exhibits improved Least Mean Square operation. A switch assigns one of several multipliers of each filter to any one of the tap locations of that filter. Each multiplier is initially assigned to a preselected tap location with a predetermined weighting coefficient. After completing successive time cycles having a duration equal to a given number of data sample periods, for each filter there is determined (a) a first group of coefficients associated with multipliers then assigned to non-zero value tap locations, and (b) a second group of coefficients associated with multipliers then assigned to zero valued locations. Multipliers associated with first group coefficients during a just-completed time cycle retain their tap locations during the next time cycle. Multipliers associated with second group coefficients during a just-completed time cycle are reassigned to new tap locations for use during the next time cycle.

23 Claims, 3 Drawing Sheets

SPARSE EQUALIZATION FILTER ADAPTIVE IN TWO DIMENSIONS

BACKGROUND OF THE INVENTION

1. Field of the Invention

The present invention relates to both sparse infinite impulse response (IIR) equalizer filters and sparse decision feedback equalizer (DFE) filters, such as may be employed for deghosting (multipath equalization) in terrestrial television communication channels and, more particularly, to such a filter, which is two-dimensional, least-mean-square (LMS) like, sparse (TLLS) adaptive, that, in response to a multipath received signal, determines both the particular tap location of and the particular weighting factor for each of sparse non-zero valued taps of the filter which result in a maximum cancellation of ghosts being first achieved and then maintained over time.

2. Description of the Prior Art

Incorporated by reference herein is the article "A Tutorial on Ghost Canceling in Television Systems," by Ciciora et al., which appears in IEEE Transactions on Consumer Electronics, Vol. CE 25, February 1979. The structure and operation of an LMS based adaptive filter used for deghosting is described on pages 42 and 43 of this article.

LMS based adaptive filters have been widely used in digital communication systems for channel equalization. A desirable feature of LMS based adaptive filters is that the derivation of the proper values of its weighting coefficient factors does not require the need for a previously-computed training signal. However, the number of mathematical operation elements implemented in an LMS based equalizer filter is linearly proportional to the number of equalizer filter taps. In some applications, a large number of taps may be needed. For example, in digital terrestrial TV broadcasting, the multipath spread can reach as much as 2 ms, resulting in the total number of equalizer filter taps required being in the order of 200, or in some cases even more. An LMS based digital equalizer filter for use with an ongoing stream of realvalued data samples requires mathematical operations that include two multiplications per tap for each successive sample period T (where T is 0.2 μs (5 million samples per second) or less for the case of a received digitized NTSC television signal). This results in a huge number of mathematical operations per second, which causes a corresponding high IC implementation cost for a large LMS based adaptive equalizer filter. This is one reason that prevents a large LMS based adaptive equalizer filter from being used in many commercial applications.

In the case of a deghosting filter, only a small fraction of the 200 or more filter taps have non-zero values. This permits the use of a sparse filter having tap locations corresponding only to these non-zero values. The respective weighting factor coefficient values corresponding to these non-zero valued filter taps must be chosen so that a maximum cancellation of ghosts results. The problem is to determine (1) which tap locations at any time are the non-zero valued filter taps and (2) the required values of the respective weighting factor coefficients. The conventional way known in the art is to provide the required values of the respective weighting factor coefficients is to use an adaptive digital filter responsive to a training signal that has been previously derived by a computer program making use of a priori information. By way of example, such a training-signal computer program is disclosed in U.S. Pat. No. 5,065,242, which issued to Dieterich et al. on Nov. 11, 1991. Further, U.S. Pat. No. 5,388,062, issued to Knutson, on Feb. 7, 1995, requires a training-signal computer program for use in programmably reconfiguring a deghosting filter, selectively rendering the effective tap locations of the reconfigured filter to only its non-zero-valued tap locations, and programmably providing selectable weighting factor coefficient values to only these its non-zero-valued tap locations.

In many applications, including television, the communication channel is corrupted with sparsely separated echoes. In such case, the receiver adaptive filter, after adaptation setting time, will have some non-zero valued taps and some of zero-valued taps. Only those non-zero valued taps contribute to the channel echo cancellation. However, under slowly-time varying channel conditions, the delay of the echo might be time-dependent, so that from time to time in the echo tracking mode, the non-zero valued tap locations in the filter may need to be relocated accordingly.

Reference is made to the article "An adaptive multiple echo canceller for slowly time varying echo paths," by Yip and Etter, which appeared in the IEEE Transactions on Communications, October 1990. The basic Yip-Etter approach is that, where there is more than one echo to be canceled, the filter tracking performance for the time-varying echo will be improved using a separate one of a plurality of smaller filters, each of which is designed to cancel a separate one of the multiple echoes. The improvement in the performance is due to the elimination of zero-valued taps of the conventional large deghosting filter. The problem with the Yip-Etter approach is that it requires complex mathematical operations for echo location and echo duration estimations. Therefore, the Yip-Etter approach will hardly reduce the IC implementation cost.

In view of the above, there is a need for a relatively inexpensive deghosting filter that operates continuously in real time to first determine, without the use of a training signal, the zero-valued taps of the conventional large deghosting filter and then effectively eliminates such zero-valued taps. Further, there is a need for such an inexpensive filter that is capable of canceling all of the multiple echoes without suffering from the aforesaid problem of the Yip-Etter approach.

SUMMARY OF THE INVENTION

The invention is directed to an equalizer filter system that improves the operation in accordance with the LMS algorithm of a sparse digital adaptive IIR or DFE filter, wherein the adaptive filter includes an FIR filter that comprises L+1 tap locations in number including a tap location at the first input thereof, M multipliers in number, where M<L+1, and switch means for assigning any one of the M multipliers to any one of the L+1 tap locations, where "L" is defined in equations (1)–(3) below.

Each of the M multipliers is initially assigned to a separate preselected one of the L+1 tap locations and each assigned multiplier is initially supplied with its own preselected weighting coefficient w. Then, at the completion of each one of successive time cycles having a duration equal to a given plural number D of digital data sample periods T, there is determined (a) a first group of individual weighting coefficients w, associated with multipliers then assigned to certain ones of the L+1 tap locations, that are non-zero valued (i.e., have an absolute magnitude which exceeds in value a given minimal positive threshold value) and (b) a second group of individual weighting coefficients w, associated with multipliers then assigned to the certain tap locations, that are zero valued (i.e., have an absolute magnitude which does not exceed in value the given minimal positive threshold value).

The multipliers associated with the individual weighting coefficients w of the first group during a just-completed one of the successive time cycles retain their assignment to the certain ones of the L+1 tap locations during the next-occurring one of the successive time cycles, and the multipliers associated with the individual weighting coefficients w of the second group during a just-completed one of the successive time cycles are reassigned to tap locations other than the certain ones of the L+1 tap locations, for use during the next-occurring one of said successive time cycles. This reassignment preferably follows predetermined priority rules.

DESCRIPTION OF THE PREFERRED EMBODIMENTS

Figure 1:
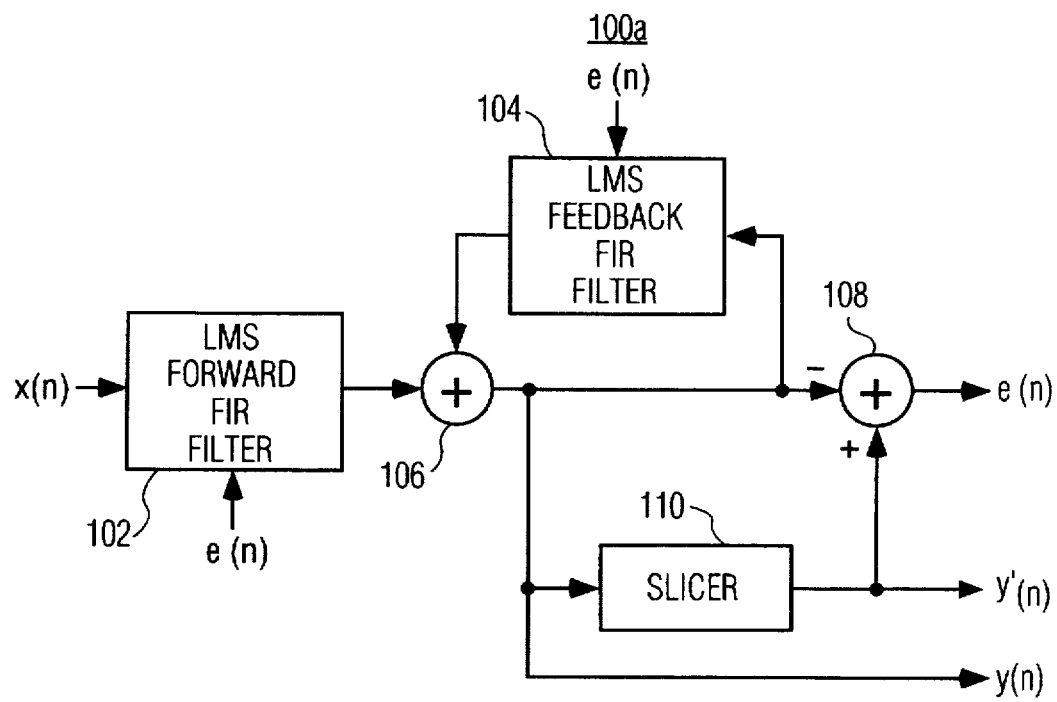
FIG. 1 is a block diagram of a preferred embodiment of a prior-art LMS-based adaptive IIR equalizer filter.

The preferred embodiment of the prior-art LMS-based adaptive equalizer IIR filter 100a shown in FIG. 1 comprises LMS forward FIR filter 102, LMS feedback FIR filter 104, summer 106, summer 108 and slicer 110. Each of successively-occurring digital data samples x(n) of an ongoing sample stream is applied to the input of LMS forward FIR filter 102. The resulting ongoing digital data samples at the output of LMS forward FIR filter 102 are applied to a first input of summer 106 and the ongoing digital data samples at the output of LMS feedback FIR filter 104 are applied to a second input of summer 106. The ongoing digital data samples y(n) at the output of summer 106 (which constitute the output from the adaptive equalizer IIR filter) are applied to the input of LMS feedback FIR filter 104, the negative input of summer 108 and the input to slicer 110. Slicer 110, which slices off a given number of the lower significant bits of each digital data sample applied to the input thereof, forwards the remaining more significant bits of each digital data sample (Y'(n) in FIG. 1) to the positive input of summer 108. Summer 108 derives, as an output, a stream e(n) of digital error samples, each of which is applied to an error input of each of FIR filters 102 and 104 (as shown in FIG. 1 with detached contacts).

Figure 2:
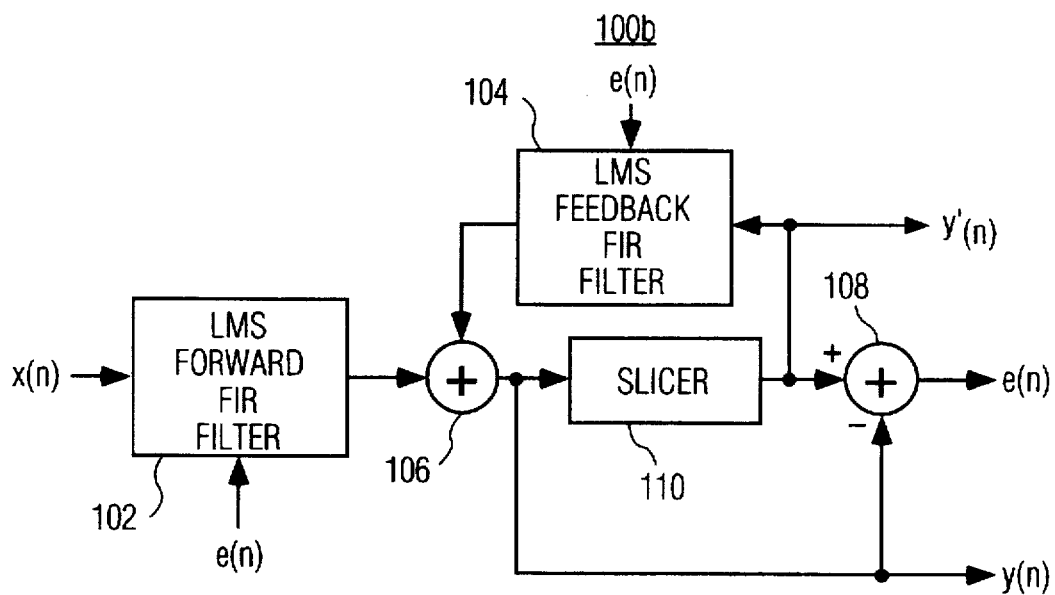
FIG. 2 is a block diagram of a preferred embodiment of a prior-art LMS-based adaptive DFE equalizer filter.

The preferred embodiment of the prior-art LMS-based adaptive equalizer DFE filter 100b shown in FIG. 2 also comprises LMS forward FIR filter 102, LMS feedback FIR filter 104, summer 106, summer 108 and slicer 110. As shown in FIG. 2, the ongoing digital data samples at the output of slicer 110 (Y'(n) in FIG. 1) (rather than the ongoing digital data samples y(n) at the output of summer 106) are applied to the input of LMS feedback FIR filter 104. This is the only difference in structure between the LMS-based adaptive equalizer DFE filter 100b shown in FIG. 2 and the LMS-based adaptive equalizer IIR filter 100a shown in FIG. 1.

As known in the art, each data sample is a multibit binary number in which the most significant bit is indicative of the polarity of the number (i.e., positive or negative) and the remaining bits are indicative of the magnitude of the number. The more significant bits of each digital data sample that are forwarded from the output of slicer 110 to the positive input of summer 108 may consist of solely this most significant data-sample bit (i.e., the polarity-indicative bit) or it may consist of this most significant bit together with at least the next most significant bit (i.e., the most significant magnitude-indicative bit). In either case, the polarity of the number represented by each of the stream of digital error samples e(n) is opposite to that of the data sample from which it is derived and its magnitude is either equal to or less than that of the data sample from which it is derived.

The algorithm of a conventional LMS adaptive filter can be described by its input/output equation and its tap value update equation.

The input/output equation is $$y_n = \sum_{i}^{L} w_{n,i} x_{n-i} \qquad (1)$$

$$= w_{n,0} x_n + w_{n,1} x_{n-1} + \ldots + w_{n,L} x_{n-L}, \qquad (2)$$

where the index i and n represent, respectively, tap location and time; and the tap value update equation is $$W_{n+1,i} = W_{n,i} + \mu e_n x_{n,i}, i=0, 1, \ldots L, \qquad (3)$$

where $e_n$ is the error term defined as the difference of the filter output, $y_n$, and the desired output, $d_n$, at the time=n. Thus, $$e_n = d_n - y_n. \qquad (4)$$

From the above equations, it is clear that, during each sample period, the x value at each of the L filter tap locations requires a first multiplication by the value of its weighting coefficient $w_n$ during that sample period, in accordance with equation 2, followed by a second multiplication by the value of its error term $e_n$ during that sample period, in accordance with equation 3.

In a realistic example of a conventional digital LMS deghosting filter for an NTSC television signal, which filter, such as shown in either FIG. 1 or FIG. 2, LMS forward FIR filter 102 may have 100 filter locations and LMS feedback FIR filter 104 may have 150 filter locations, while each sample period has a duration of only about 0.2 µs. Thus, the required total number of multiplications per second is 1.25 billion (or 5 million per second for each individual one of the 250 tap locations). Only real digital data samples and real weighting coefficients are employed by a digital deghosting filter for an NTSC television signal. However, a deghosting filter for high-definition television (HDTV) employs complex digital data samples and complex weighting coefficients, while each sample period should have a duration of significantly less than 0.2 µs to accommodate the wider video bandwidth of a high-definition television signal. This means that each tap location requires eight (rather than only two) multiplications during each sample period, resulting in the total number of multiplications per second for all 250 tap locations being significantly greater than 1.25 billion (or significantly greater than 5 million per second for each individual one of the 250 tap locations).

As is known, each tap location of each LMS FIR filter component of an LMS-based adaptive equalizer (such as FIR filters 102 and 104) is supplied with initial weighting coefficient value, which are present at time ZERO. In the case of a deghosting filter, a preselected tap location (e.g. the middle tap location) of each FIR filter is supplied with an initial weighting coefficient value equal to +1, thereby to correspond to the television main signal, and all the other taps of each FIR filter are supplied, respectively, with initial weighting coefficients having a positive minimal-magnitude value. Either the LMS-based adaptive IIR equalizer of FIG. 1 or the LMS-based adaptive DFE equalizer of FIG. 2, operating from time ZERO as a deghosting filter in accordance with the aforesaid LMS equations 1 and 3, will result after a large number of sample periods in the minimumization of the value of the error term en and the convergence of weighting coefficients of each of the tap locations converging to a relatively stable value. Converged weighting coefficients having non-zero magnitude values (i.e., a value above a threshold minimal absolute value) are associated with the minority of tap locations corresponding, respectively, to the television main signal and each ghost, if any, in the received television signal. The majority of tap locations are associated with converged weighting coefficients having zero values and, therefore, are unnecessary, since they do not contribute anything to the filter output Yn. The problem is that the identity of the particular ones of the large total number of tap locations of each of FIR filters 102 and 104 that happen to be zero-valued at any time remains indeterminate until they have been determined only after the operation of the above discussed conventional LMS algorithm, with its need for a huge number of multiplications.

Figure 3:
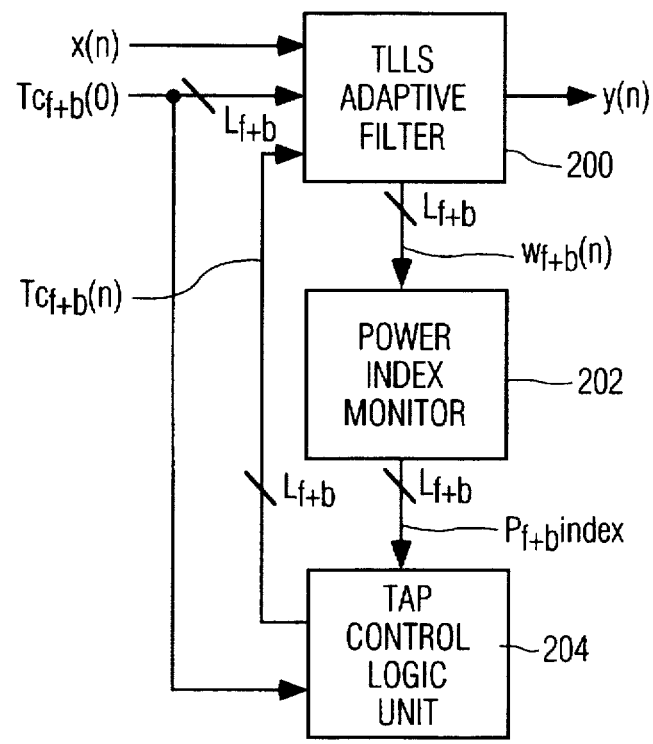
FIG. 3 is a functional block diagram of the overall system components of a TLLS-based adaptive equalizer filter.

Referring now to FIG. 3, there is shown a functional block diagram of the overall system components of a TLLS-based adaptive equalizer filter which solves the aforesaid problem caused by the use of the conventional LMS algorithm. As shown, the overall TLLS-based adaptive equalizer filter system comprises TLLS equalizer filter 200, power index monitor 202 tap control logic unit 204, and. An ongoing stream of digital data samples x(n) is applied to a first input of TLLS equalizer filter 200; a set of user-determined initial tap-control signals $Tc_{f+b}(0)$ are applied to respective second inputs of TLLS equalizer filter 200 and to respective first inputs of tap control logic 204; a set of adaptive tap-control signals $Tc_{f+b}(n)$ from tap control logic 204 are applied to respective third inputs of TLLS equalizer filter 200; a set of weighting coefficient values $w_{f+b}(n)$ from TLLS equalizer filter 200 are applied to respective inputs of power index monitor 202, a set of weighting-coefficient power indices $P_{f+b}$index from power index monitor 202 are applied to respective second inputs of tap control logic 204, and an ongoing stream of digital data samples y(n) constitutes the output from TLLS equalizer filter 200.

Figure 4:
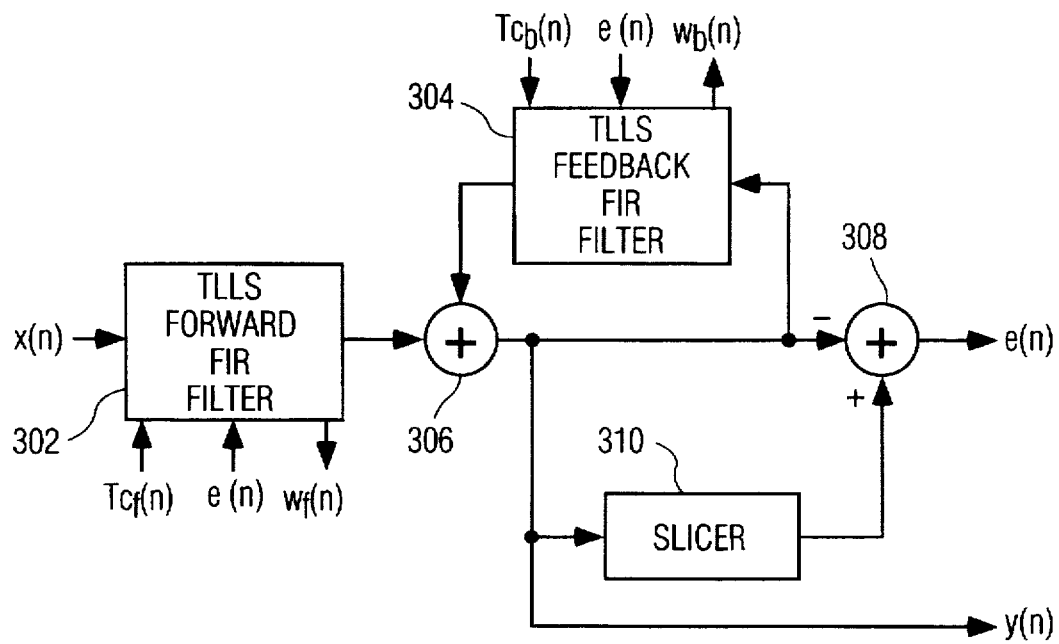
FIG. 4 is a block diagram of a preferred embodiment of the present invention which constitutes a TLLS-based adaptive IIR equalizer filter.

As shown in FIG. 4, TLLS equalizer filter 200, by way of example, may be TLLS equalizer filter IIR filter 200a having a structure similar to that of LMS-based adaptive equalizer IIR filter 100a shown in FIG. 1. More specifically, the structure of FIG. 4 differs from that of FIG. 1 only in that forward and feedback LMS FIR filters 102 and 104 of FIG. 1 are replaced in FIG. 4 with forward and feedback TLLS FIR filters 302 and 304. In all other respects, TLLS equalizer filter IIR filter 200a is identical in structure and function to LMS-based adaptive equalizer IIR filter 100a. Alternatively, TLLS equalizer filter 200 may take the structural form of a TLLS equalizer filter DFE filter 200b (not shown) having a structure identical to that of LMS-based adaptive equalizer IIR filter 100b shown in FIG. 2, except for the replacement of only the forward and feedback LMS FIR filters 102 and 104 of FIG. 2 by forward and feedback TLLS FIR filters 302 and 304.

As indicated in FIG. 4, forward TLLS FIR filter 302 has the respective subsets $Tc_f(0)$ and $Tc_f(n)$ of sets $Tc_{f+b}(0)$ and $Tc_{f+b}(n)$ applied as additional inputs thereto and has the subset $w_f(n)$ of the set $w_{f+b}(n)$ constituting an additional output therefrom. Similarly, feedback TLLS FIR filter 304 has the respective subsets $Tc_b(0)$ and $Tc_b(n)$ of sets $Tc_{f+b}(0)$ and $Tc_{f+b}(n)$ applied as additional inputs thereto and has the subset $w_b(n)$ of the set $w_{f+b}(n)$ constituting an additional output therefrom.

Figure 5:
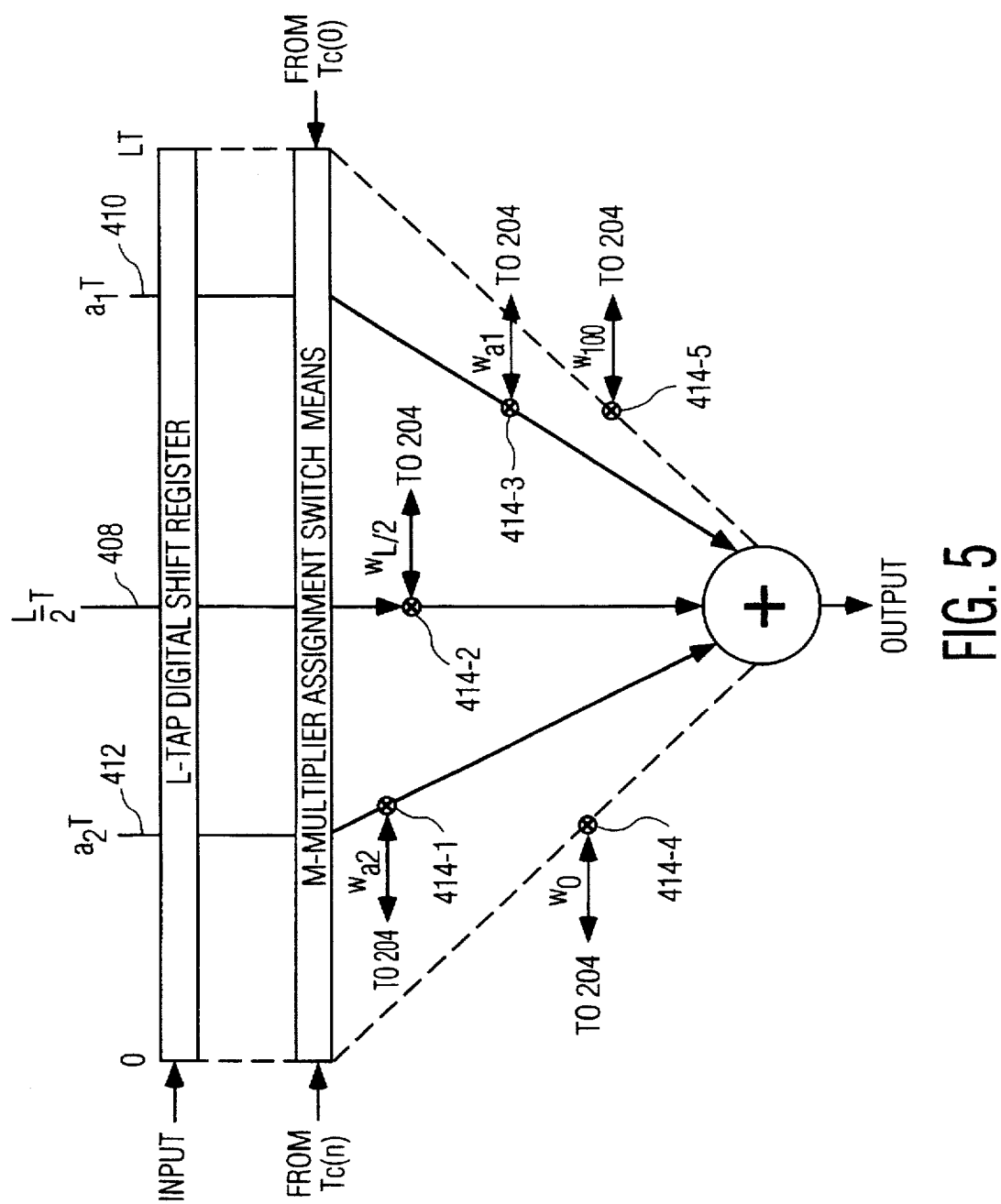
FIG. 5 is a block diagram of a generic TLLS FIR filter which may be specifically utilized for each of the forward and feedback TLLS FIR filters of FIG. 3.

FIG. 5 shows a block diagram of a generic TLLS FIR filter 400 which may be specifically utilized for each of forward and feedback TLLS FIR filters 302 and 304 of FIG. 4. TLLS FIR filter 400 comprises L-tap digital shift register 402, M-multiplier assignment switch means 404 and summer 406. A stream of digital data samples x(n) having a sample period T is applied to the input of shift register 402 and shift register is normally shifted at a shift rate equal to 1/T. L+1 tap locations are defined by L-tap shift register 402, including an additional tap 0 at the input of shift register 402. Switch means 404 is capable initially of assigning each of M multipliers to any one of the L+1 tap locations in accordance with the set of Tc (0) tap control signals applied thereto at time ZERO and, thereafter, in accordance with the set of Tc (n) adaptive tap control signals applied thereto. The respective outputs of the assigned multipliers are applied as inputs to summer 406, and summer 406 derives an output equal to the sum of the assigned multiplier outputs that are applied to it (which summer 406 output constitutes the output from TLLS FIR filter 400).

In general, the present invention only requires that the number of multipliers M, which are user determined, be less than the number of shift register tap locations L+1 (i.e., M<L+1). However, when TLLS FIR filter 400 is employed in a sparse deghosting equalizer filter, the ratio M/L is usually never larger than 50% and is often substantially smaller than 50%. In the following detailed description of the principles of the present invention, it is assumed that TLLS FIR filter 400 is being employed in a sparse deghosting equalizer filter in which tap location L/2 corresponds to main signal 408 of a received television signal and that at time ZERO there is no information as to whether or not the received television signal includes ghosts despite the unknown facts that tap location $a_1T$ corresponds to the position of a sole preghost 410 in the received television signal and tap location $a_2T$ corresponds to the position of a sole postghost 412 in the received television signal.

In accordance with the principles of the present invention, at time ZERO, the set of user determined Tc (0) tap control signals are such that switch means 404 assigns one of the M multipliers, with a+1 weighting coefficient, to main-signal tap location L/2 and assigns the remaining M-1 multipliers, each with a minimal positive weighting coefficient, to tap locations that are substantially symmetrically disposed about main-signal tap location L/2 and are, to the extent possible, equally spaced from one another in the following predetermined order (in which main- signal tap location L/2 is number 1) by an amount which permits a maximum coverage of the entire range of L+1 tap locations by the M multipliers:

(M-1)- . . . 5-3-1-2-4 . . .-M, where - represents the spacing between adjacent multipliers. Thus, by way of examples, where M/L=50%, there is one unassigned tap location between adjacent assigned tap locations; where M/L=33%, there are two unassigned tap locations between adjacent assigned tap locations, and where M/L=25%, there are three unassigned tap locations between adjacent assigned tap locations.

TLLS FIR filter 400 is then allowed to run in an LMS fashion in accordance with the aforesaid equations 1 and 3 for a first of successive time cycles, each of which is DT in duration, where D is a predetermined relatively large number (e.g., 3000) which results in a DT cycle duration being sufficiently long to permit convergence of the weighting coefficients of all the initially assigned tap locations. At the end of this first time cycle, the respective weighting coefficients of all the initially assigned tap locations are forwarded to power index monitor 202. Power index monitor 202 performs a first function of measuring the power of each of these tap locations by squaring each of the respective weighting coefficients forwarded thereto (i.e., $P_i = |w_{n,i}|^2$ and then performs a second function of power indexing each $P_i$ by assigning a binary ONE to each $P_i$ which exceeds in magnitude a given threshold minimal value (which is indicative of a non-zero valued weighting coefficient) and assigning a binary ZERO to each $P_i$ which does not exceeds in magnitude the given threshold minimal value (which is indicative of a zero valued weighting coefficient).

The resulting power index of all the evaluated weighting coefficients is forwarded as a P-index input to tap control logic unit 204 which, in response thereto, reads each power index, and then performs logical functions in accordance with the following rules to derive its adaptive tap control signal output:

1. Tap locations assigned to those multipliers associated with a binary ONE power index (i.e., a non-zero valued tap location) during the just completed DT cycle retain their assignment to these same multipliers for the duration of the next occurring DT cycle.

2. Tap locations assigned to those multipliers associated with a binary ZERO power index (i.e., a zero valued tap location) during the just completed DT cycle lose their assignment to any of the multipliers for the duration of the next occurring DT cycle and these multipliers become available for reassignment to other tap locations in accordance with the following criteria:

(1) An unassigned tap location during the just completed DT cycle becomes a member of a first group of candidates with a higher priority to be assigned an available multiplier during the next occurring DT cycle only if at least one of its immediate tap location neighbors during the just completed DT cycle was assigned to a multiplier associated with a binary ONE power index.

(2) An unassigned tap location during the just completed DT cycle becomes a member of a second group of candidates with a lower priority to be assigned an available multiplier during the next occurring DT cycle only if both of its immediate tap location neighbors during the just completed DT cycle were not assigned to a multiplier.

(3) Any tap location which does not meet either criterion (1) or (2) is not a candidate for assignment of an available multiplier during the next occurring DT cycle. (thus, criterion (3) includes any tap location that during the just completed DT cycle was assigned to a multiplier associated with a binary ZERO power index).

(4) Tap locations which are members of the first group of candidates are assigned available multipliers in a given order of importance, in which any candidate tap location closer to middle tap location L/2 is more important than any candidate tap location further away from middle tap location L/2, until either all tap locations that are members of the first group have been assigned multipliers or all available multipliers have been assigned.

(5) If any available multipliers remain after all members of the first group of candidates have been assigned multipliers, tap locations which are members of the second group of candidates are assigned available multipliers, in the same given order of importance, until either all tap locations that are members of the second group have been assigned multipliers or all available multipliers have been assigned.

Tap control logic unit 204 performs the aforesaid logical functions at the end of each successive one of the DT cycles, which results in an efficient search being made by the M multipliers to first find and then, once found, retain non-zero valued tap locations (i.e., those associated with a binary ONE power indices) over ongoing successive DT cycles, so long as each found non-zero valued tap location persists over time. At the same time, the search continues for additional non-zero valued tap locations during each of the ongoing successive DT cycles, by employing, in each one of the successive DT cycles, those of the M multipliers made available during the DT cycle that immediately preceded that one DT cycle.

Returning to FIG. 5, after a number of DT cycles, the search will have found non-zero valued tap locations LT/2, $a_1T$ and $a_2T$ (indicated in FIG. 5 by solid lines) which contribute to the output of summer 406, and the multipliers 414-1 to 414-3 then assigned to these three non-zero valued tap locations will be retained by them during future DT cycles.

However, the M-3 multipliers then associated with zero valued tap locations (such as multipliers 414-4 and 414-5 associated with tap locations 0 and 100, which are indicated in FIG. 5 by dashed lines) remain involved in searching during each subsequent DT cycle. Therefore, if over time, the non-zero valued tap location corresponding to either one or both of the aforesaid ghosts should change in location, or another ghost should appear, the continuing search will find them relatively quickly.

It is apparent, statistically speaking, that, in practice, a larger M/L+1 ratio of multipliers to tap locations results, on average, in a smaller number of DT cycles being required for the search to find all the ghosts that may exist. However, a larger M/L+1 ratio increases cost by requiring a greater number of multipliers. Therefore, the optimum M/L+1 ratio depends on the particular environment in which the TLLS adaptive filter is to be used.

While only a preferred embodimemt of a TLLS adaptive filter, which is implemented with both an output-weighted forward TLLS FIR filter and an output-weighted feedback TLLS FIR filter, has been specifically described herein, the present invention is intended to cover a TLLS adaptive filter which is implement with one or more input-weighted TLLS FIR filters, or with only a forward TLLS FIR filter or with only a feedback TLLS FIR filter.

What is claimed is:

1. In an equalizer filter system comprising a sparse digital adaptive filter and means for controlling the operation of said adaptive filter, wherein (1) said adaptive filter includes a digital multitap finite impulse response (FIR) filter responsive to a stream of successive data samples x(n) having a sample period T applied to a first input thereof; (2) said means for controlling the operation of said adaptive filter includes first means for deriving a least mean square (LMS) error term e(n) in response to each successive output sample y(n) from said adaptive filter and applying each derived LMS error term e(n) to a second input of said FIR filter to effect operation of said FIR filter in accordance with the LMS algorithm; and (3) said multitap FIR filter comprises L+1 tap locations in number including a tap location at said first input thereof, M multipliers in number, where M<L+1, and switch means for assigning any one of said M multipliers to any one of said L+1 tap locations; the improvement wherein said means for controlling the operation of said adaptive filter further includes:

second means for initially assigning each of said M multipliers to a separate preselected one of said L+1 tap locations and initially supplying each assigned multiplier with its own preselected weighting coefficient w;

third means, responsive to the completion of each one of successive time cycles, for determining (a) a first group of individual weighting coefficients w, associated with multipliers then assigned to certain ones of said L+1 tap locations, that have an absolute magnitude which exceeds in value a given minimal positive threshold value and (b) a second group of individual weighting coefficients w, associated with multipliers then assigned to said certain tap locations, that have an absolute magnitude which does not exceed in value said given minimal positive threshold value, wherein each one of said successive time cycles has a duration equal to a given plural number D of sample periods T;

fourth means, responsive to the individual weighting coefficients w of said first group during a just-completed one of said successive time cycles, for retaining the assignment of the multipliers associated with these individual weighting coefficients w of said first group to said certain ones of said L+1 tap locations during the next-occurring one of said successive time cycles; and fifth means, responsive to the individual weighting coefficients w of said second group during the just-completed one of said successive time cycles, for reassigning multipliers associated with these individual weighting coefficients w of said second group to tap locations other than said certain ones of said L+1 tap locations, for use during the next-occurring one of said successive time cycles.

2. The equalizer filter system defined in claim 1, wherein:

said fifth means follows predetermined priority rules in reassigning multipliers to said tap locations other than said certain ones of said L+1 tap locations.

3. The equalizer filter system defined in claim 2, wherein said predetermined priority rules comprise the following rules:

any of said tap locations other than said certain ones of said L+1 tap locations has a higher priority of being assigned a multiplier for use during the next-occurring one of said successive time cycles only if at least one of its immediate neighbor tap locations was a member of said first group during the just-completed one of said successive time cycles;

any of said tap locations other than said certain ones of said L+1 tap locations has a lower priority of being assigned a multiplier for use during the next-occurring one of said successive time cycles only if neither of its immediate neighbor tap locations was a member of said first or second groups during the just-completed one of said successive time cycles; and any of said tap locations other than said certain ones of said L+1 tap locations which is neither a higher or a lower priority tap location can be assigned a multiplier for use during the next-occurring one of said successive time cycles.

4. The equalizer filter system defined in claim 3, wherein said predetermined priority rules comprise the following additional rules:

first, higher priority tap locations are assigned multipliers in a predetermined order of importance, in which any higher priority tap location which is closer than another higher priority tap location to a preselected tap location which is a member of said first group is more important than said other higher priority tap location, until either all higher priority tap locations have been assigned multipliers or all available multipliers have been assigned; and second, if multipliers are still available after all higher priority tap locations have been assigned multipliers, lower priority tap locations are assigned multipliers in a predetermined order of importance, in which any lower priority tap location which is closer than another lower priority tap location to said preselected tap location is more important than said other lower priority tap location, until either all lower priority tap locations have been assigned multipliers or all available multipliers have been assigned.

5. The equalizer filter system defined in claim 4, wherein:

said preselected tap location is the middle tap location, L/2, of said FIR filter.

6. The equalizer filter system defined in claim 1, wherein said sparse digital adaptive filter is suitable for use as a deghosting filter for a television signal that has been received over a terrestrial communication channel; and wherein:

said second means initially assigns one of said M multipliers to a particular preselected one of said L+1 tap locations and initially supplies a weighting coefficient w having a value+1 to that one multiplier which is assigned to said particular preselected one of said L+1 tap locations, and initially assigns each of the remaining M-1 multipliers to other preselected ones of said L+1 tap locations and initially supplies a weighting coefficient w having a minimal positive value to each of said remaining M-1 multipliers, whereby said particular preselected one of said L+1 tap locations corresponds to the television main signal.

7. The equalizer filter system defined in claim 6, wherein:

said fifth means follows predetermined priority rules in reassigning multipliers to said tap locations other than said certain ones of said L+1 tap locations.

8. The equalizer filter system defined in claim 7, wherein said predetermined priority rules comprise the following rules:

any of said tap locations other than said certain ones of said L+1 tap locations has a higher priority of being assigned a multiplier for use during the next-occurring one of said successive time cycles only if at least one of its immediate neighbor tap locations was a member of said first group during the just-completed one of said successive time cycles;

any of said tap locations other than said certain ones of said L+1 tap locations has a lower priority of being assigned a multiplier for use during the next-occurring one of said successive time cycles only if neither of its immediate neighbor tap locations was a member of said first or second groups during the just-completed one of said successive time cycles; and any of said tap locations other than said certain ones of said L+1 tap locations which is neither a higher or a lower priority tap location can be assigned a multiplier for use during the next-occurring one of said successive time cycles.

9. The equalizer filter system defined in claim 8, wherein said predetermined priority rules comprise the following additional rules:

first, higher priority tap locations are assigned multipliers in a predetermined order of importance, in which any higher priority tap location which is closer than another higher priority tap location to said particular preselected tap location is more important than said other higher priority tap location, until either all higher priority tap locations have been assigned multipliers or all available multipliers have been assigned; and second, if multipliers are still available after all higher priority tap locations have been assigned multipliers, lower priority tap locations are assigned multipliers in a predetermined order of importance, in which any lower priority tap location which is closer than another lower priority tap location to said particular preselected tap location is more important than said other lower priority tap location, until either all lower priority tap locations have been assigned multipliers or all available multipliers have been assigned.

10. The equalizer filter system defined in claim 9, wherein:

said particular preselected tap location is the middle tap location, L/2, of said FIR filter.

11. The equalizer filter system defined in claim 1, wherein:

the ratio of the number of multipliers M to the number of tap locations L+1 is no greater than 50%.

12. The equalizer filter system defined in claim 1, wherein said third means comprises a power index monitor that includes:

sixth means for computing the square of each of the of said individual weighting coefficients w associated with multipliers then assigned to said certain ones of said L+1 tap locations; and seventh means for assigning a binary ONE power index to each individual squared weighting coefficient w that has an absolute magnitude which exceeds in value said given minimal positive threshold value and for assigning a binary ZERO power index to each individual squared weighting coefficient w that has an absolute magnitude which does not exceed in value said given minimal positive threshold value;

whereby said first group comprises each of those individual squared weighting coefficients w that have been assigned a binary ONE power index and said second group comprises each of those individual squared weighting coefficients w that have been assigned a binary ZERO power index.

13. The equalizer filter system defined in claim 12, wherein said system comprises (A) a tap-control logic unit which incorporates both said fourth and fifth means and (B) eighth means for supplying said tap-control logic unit with the identity of each of said separate preselected ones of said L+1 tap locations initially-assigned by said second means, and wherein:

said fourth means determines which of said multipliers are to retain their tap location assignment during the next-occurring one of said successive time cycles in accordance with said binary ONE power indices of said just-completed one of said successive time cycles; and said fifth means determines which of said multipliers are to be reassigned during the next-occurring one of said successive time cycles in accordance with said binary ZERO power indices of said just-completed one of said successive time cycles, determines the identity of the tap locations assigned to reassigned multipliers during the second one of said successive time cycles in accordance with the identity of each of said initially-assigned ones of said L+1 tap locations during the first completed one of said successive time cycles, and, thereafter, determines the identity of the tap locations assigned to reassigned multipliers during each subsequent one of said successive time cycles in accordance with the identity of each of said assigned ones of said L+1 tap locations during the immediately preceding completed one of said successive time cycles.

14. The equalizer filter system defined in claim 1, wherein each successive output sample y(n) is a multibit binary number, and said first means comprises:

an algebraic summer having each successive output sample y(n) applied to a negative input thereof; and a slicer, responsive to each successive output sample y(n) applied to an input thereof, for slicing off one or more of the less significant bits of that sample to derive thereby an output from said slicer that comprises at least the most significant bit of each successive output sample y(n), said slicer output being forwarded to the positive input of said algebraic summer;

whereby the error term e(n) is derived at the output of said algebraic summer.

15. The equalizer filter system defined in claim 14, wherein:

said FIR filter is a forward FIR filter of said adaptive filter.

16. The equalizer filter system defined in claim 14, wherein:

said FIR filter is a feedback FIR filter of said adaptive filter, in which each successive output sample y(n) is applied to said first input thereof, whereby said adaptive filter operates as an IIR filter.

17. The equalizer filter system defined in claim 16, wherein said adaptive filter further includes a forward digital multitap FIR filter responsive to a stream of successive data samples x(n)' having said sample period T applied to a first input thereof and said error term e(n) applied to a second input thereof to effect operation of said forward FIR filter in accordance with the LMS algorithm, and wherein said forward FIR filter comprises structure similar to that of said feedback FIR filter, and wherein said system further comprises:

a second summer having the successive output samples of said forward FIR filter applied to a first input thereof and the successive output samples of said feedback FIR filter applied to a second input thereof to derive, as an output therefrom, said successive output samples y(n) which are applied to said first input of said feedback FIR filter and to said negative input of said algebraic summer.

18. The equalizer filter system defined in claim 14, wherein:

said FIR filter is a feedback FIR filter of said adaptive filter, in which each successive output sample from said slicer is applied to said first input thereof, whereby said adaptive filter operates as a DFE filter.

19. The equalizer filter system defined in claim 18, wherein said adaptive filter further includes a forward digital multitap FIR filter responsive to a stream of successive data samples x(n)' having said sample period T applied to a first input thereof and said error term e(n) applied to a second input thereof to effect operation of said forward FIR filter in accordance with the LMS algorithm, and wherein said forward FIR filter comprises structure similar to that of said feedback FIR filter, and wherein said system further comprises:

a second summer having the successive output samples of said forward FIR filter applied to a first input thereof and the successive output samples of said feedback FIR filter applied to a second input thereof to derive, as an output therefrom, said successive output samples y(n) which are applied to said input of said slicer and to said negative input of said algebraic summer.

20. A method for assigning tap locations for a sampled data sparse equalizing filter having delay means with L taps and having M less than L multipliers for weighting samples at selected tap locations, and circuitry for combining respective weighted samples to provide a filter output signal, said method comprising the steps of:

assigning said M multipliers to M predetermined tap locations;

applying predetermined multiplication coefficients to respective ones of said multipliers;

operating the sampled data sparse equalizing filter in a manner to produce updated multiplication coefficients which tend to cause convergence of the sampled data sparse equalizing filter;

examining the resulting multiplication coefficients according to a predetermined criterion;

excluding tap assignments associated with multiplication coefficients which fail said criterion; and assigning new tap locations according to an algorithm which biases selection of a different tap dependent upon its prior selection and the current selection of neighboring taps.

21. A method according to claim 20, comprising the further step of operating the sampled data sparse equalizing filter with the new tap selections in a manner to produce updated multiplication coefficients which tend to cause convergence of the sampled data sparse equalizing filter.

22. A method according to claim 20 wherein said equalizing filter is suitable for use as a deghosting filter for a television signal received from a terrestrial communication channel, said method comprising the further step of assigning a multiplication coefficient satisfying said criterion to a predetermined tap location corresponding to said television signal.

23. A method according to claim 22, wherein said predetermined tap location is the middle tap location of said filter.

* * * * *